(12) United States Patent
Rohloff

(10) Patent No.: US 6,196,114 B1
(45) Date of Patent: Mar. 6, 2001

(54) MOBILE GRILL

(75) Inventor: Bertram Rohloff, Friedanstr (DE)

(73) Assignee: Grillwalker (DE)

( * ) Notice: Subject to any disclaimer, the term of this patent is extended or adjusted under 35 U.S.C. 154(b) by 0 days.

(21) Appl. No.: 09/424,096

(22) PCT Filed: May 19, 1998

(86) PCT No.: PCT/DE98/01407

§ 371 Date: Nov. 18, 1999

§ 102(e) Date: Nov. 18, 1999

(87) PCT Pub. No.: WO98/52450

PCT Pub. Date: Nov. 26, 1998

(30) Foreign Application Priority Data

May 21, 1997 (DE) .............................................. 197 21 948

(51) Int. Cl.⁷ .............................. A47J 37/00; F24C 3/00; A45F 5/00; A47F 10/00
(52) U.S. Cl. .............................. 99/337; 99/449; 126/9 R; 126/41 R; 126/42; 224/270; 224/257
(58) Field of Search ............................. 99/449, 337, 385, 99/393, 394; 126/9 R, 30, 41 R, 275 R, 42; 224/270, 258, 191, 148.7, 257

(56) References Cited

U.S. PATENT DOCUMENTS

| 5,086,753 | * | 2/1992 | Berger | 126/41 R |
| 5,564,452 | * | 10/1996 | Kitchen | 135/96 |
| 5,628,242 | * | 5/1997 | Higley | 99/332 |
| 5,641,104 | * | 6/1997 | Wagner | 224/270 |

FOREIGN PATENT DOCUMENTS

| 4323659 | * | 1/1995 | (DE) . |
| 29616550 | * | 12/1996 | (DE) . |
| 2116418 | * | 9/1983 | (GB) . |

* cited by examiner

Primary Examiner—Reginald L. Alexander
(74) Attorney, Agent, or Firm—Milbank, Tweed, Hadley & McCloy LLP; W. Jackson Matney, Jr.

(57) ABSTRACT

The invention relates to a mobile grill, more particularly a horizontal grill. The grill is fed by a power supply, preferably a liquid gas tank, situated on the rear side of the grill. In order to prevent injuries to the operator or persons in his or her surrounding area, safety devices are provided which cut off the gas supply in an case of emergency. The grill can be handled and carried by a single person.

20 Claims, 2 Drawing Sheets

MOBILE GRILL

BACKGROUND OF THE INVENTION

The invention pertains to a portable grill which is equipped with safety devices and an ergonomic supporting structure carried by an operator. More specifically, the invention relates to a mobile device having a horizontal grill, which may be arranged in front of the body of a person carrying the device, wherein the person is surrounded by a framework including transverse and longitudinal spars and the person may support the frame by various means. At the rear side of the device, at least one power supply unit may be positioned to supply the grill and/or other power-consuming devices via corresponding supply lines.

Two devices described by PCT Publication No. WO94/23630, to Wagner, and German utility model DE 296 16 550 U1, to Harff, are incorporated by reference in their entirety and are discussed below.

Ambulant sales appliances, such as grills with integrated carrying frames supported by or resting in or on the shoe of the vendor are known. For example, WO94/23630 describes an ambulant sales appliance having a grill, a supporting plate situated in front of the vendor on which a cooking appliance is arranged, a horizontal load equalizing plate mounted between two side bars that extend past the vendor towards his back. On either side of the vendor, storage bins are mounted to the side bars. Shoulder belts and a supporting pole, which extends down the leg of the vendor to the vendor's shoe, are required to support the weight of the device.

According to the manufacturer, the appliance described in WO94/23630 weighs about 56 kilograms without goods. Thus, it is impossible to carry it without support and to walk around with it for any period of time. To the contrary, the vendor using this appliance must establish a position promising good sales with the assistance of a second person and must stay there. Thus, this appliance would be considered by the authorities as a stand for sale and, as such, it is subject to approval and is liable to charges for permits, if approved. Therefore, such an appliance has many physical and, consequently, legal defficiencies. This device is not a vendor's tray which can be carried by a vendor in a mobile and self-supporting manner.

Furthermore, another prior art device is presented in German utility model DE 296 16 550 U1, which is described as a carrying device connected with the body. This carrying device is provided with a horizontal grill operated by liquid gas and situated in front of the body of the vendor, a storage bin on either side of his body, a heating gas bottle situated behind the back of the vendor and a horizontal carrying frame secured by shoulder belts. The carrying frame is a one-piece framework forming an octagon. Two spigots are attached to the right and left lateral sides as well as to the back and front transverse sides, respectively, which engage rails that are fastened to the bottom surface of the gas bottle container, the grill, and the two storage bins. The spigots and the rails are provided with boreholes so that an axial safety means can be inserted. A holding device composed of a circular steel plate provides an upright flange at its upper side which is designed for placing the heating gas bottle. In the center of the carrying frame there is a belly band with straps on the left and right sides that come from the body of the vendor and are fastened with their ends to the diagonal sides. Two shoulder belts are releasably connected to the left and right ends, respectively, of the front and back transverse sides. In this carrying frame, the axial safety elements are cotter pins and the openings in the steel plate sections may be multiform.

One of the disadvantages of this sales appliance is that safety cannot be ensured for both the vendor and the public. The German office responsible for safety at work considers the operation of this appliance as particularly dangerous because in case of a possible fainting fit of the vendor or other circumstance where the vendor falls down, the liquid gas can accidentally pour into the device and could cause an explosion. Moreover, according to a statement of the supervisory board for the inspection of foodstuffs in Germany, the carrying device described by this utility model does not include adequate protection from weather factors, bird droppings, etc., and, therefore, it does not meet the requirements of the hygiene regulations. Additionally, due to the dimensions of the grill, the weight of the device is so heavy that it cannot be carried for a long period of time. The transport authority for the state government of Berlin has defined the standard dimensions of a vendor's tray as 1.10 m wide and 0.50 m deep. Here, too, this sales appliance may be considered a normal sales stand because it exceeds these standard dimensions.

Therefore, it is unnecessary for the vendor to carry the whole sales appliance to avoid the permit requirements because this device is considered a normal sales stand needing permits anyway.

Another reason the appliance of the utility model described in DE 296 16 550 U1 is inferior is that the mounting and dismounting process associated with this carrying device requires at least two persons because the vendor cannot get in the grill device when it has been already assembled without taking the risk of upsetting the whole system of supports. When mounting or dismounting the carrying device, a second person must rig up a trestle stand for the vendor to place the sales appliance. Then the sales appliance must be mounted or dismounted from the outside by the second person by putting it together or taking it apart in pieces because the vendor is unable to reach the components. Thus, the vendor is not able to mount or dismount the carrying frame from under or above the sales appliance.

Additionally, the desired freedom of movement is highly limited when using the appliance of this utility model because the shoulder belts are attached to the carrying device in front of the actual working zone of the grill device, thereby interfering with the grilling operation, and because the shoulder belts press on the shoulders and hinder the arms of the operator.

SUMMARY OF THE INVENTION

The invention satisfies the need and avoids the drawbacks of the prior art by providing a mobile grill device with a carrying and supporting structure that allows a vendor or operator to carry comfortably a portable grill or vendor's tray as long as possible. The invention permits high flexibility and mobility in order to be able to react quickly to changes in the market situation, to allow public use, and to enable movement similar to other persons walking along the streets. The invention allows the preparation and sale of goods both while moving and while standing. The construction of the carrying frame and its connection with the body are designed to ensure a high degree of control of the sales appliance and to permit a feeling of balance, allowing the operator to walk around problem-free. Moreover, the simple design makes it possible for the operator to mount and dismount the mobile grill device easily.

A high degree of safety for the operator and consumers must be guaranteed by the use of appropriate safety devices for the gas-pressurized devices, so that even in the case of an emergency, such as a fit of giddiness or an uncontrolled balance disturbance, the operator and the people surrounding the operator will not be harmed.

Additionally, the invention meets hygiene requirements so that goods remain undamaged by weather factors or other negative effects.

The invention includes a mobile apparatus for grilling foodstuffs by an operator carrying the apparatus having some or all of the following elements: a frame with transverse and longitudinal spars; carrying straps connected to the longitudinal spars; a belly band and intermediate straps connected to the frame; a power supply unit disposed on the rear portion of the frame and designed for use with a grill disposed on the front portion of the frame; a supply line connected between the power supply unit and the grill; at least one storage bin; safety appliances for avoiding uncontrolled gas outbursts from the power supply unit, supply line, and grill; a screening protective shield positioned in front of the grill; and a spring-tightened backrest for relieving the back of an operator, supporting the power supply unit and stabilizing the apparatus against imbalance. In one embodiment, a second power supply unit is used to provide power to the safety appliances. In another embodiment, a power supply unit provides cooling and/or heating depending on the need for cooling or heating foodstuffs, beverages and accessories. In a further embodiment, a power supply unit may be included for supplying power to said safety appliances and cooling and/or heating devices, depending on the need. The power supply units are preferably contained within one or more holding vessels. Additionally, these units may be secured with one or more tightening belts. In a preferred embodiment, a tilt sensor for detecting the sloping position of the apparatus and a remote gas switch for shutting off the power supply may be included, wherein the gas switch is activated by the tilt sensor. A pressure relief valve may be employed.

In one embodiment, the invention includes a storage bin. The bin may be situated between the belly band and the grill, wherein the mobile grill device is supported by wedging the bin in the space between the belly of the operator and the grill or the bin may be disposed in a holder attached to the grill. In another embodiment, the invention includes an umbrella that may be releasably affixed to the frame providing protection and shelter for the operator and the apparatus carried by the operator. In a further embodiment, the screening protective shield extends to enclose at least one of the lateral sides of the grill and is made of a non-clouding windscreen.

The mobile grill device constructed according to the principles of the invention may be carried satisfactorily by a single person and has the desired flexibility and mobility with substantially less weight. The operator supporting the mobile grill device has an essential advantage by appearing in public, where he supposes a demand for his goods exists, and has the ability to move toward consumers and to react to the market of consumers.

The ability of the operator to support the mobile grill device by various or even few parts of the body provides a tremendous advantage. The mobile grill device according to this invention may be very simply mounted and dismounted. The compactness of the carrying system allows the operator to mount, to shoulder, to put down and to dismount the device on his own.

DETAILED DESCRIPTION

Figure 1:
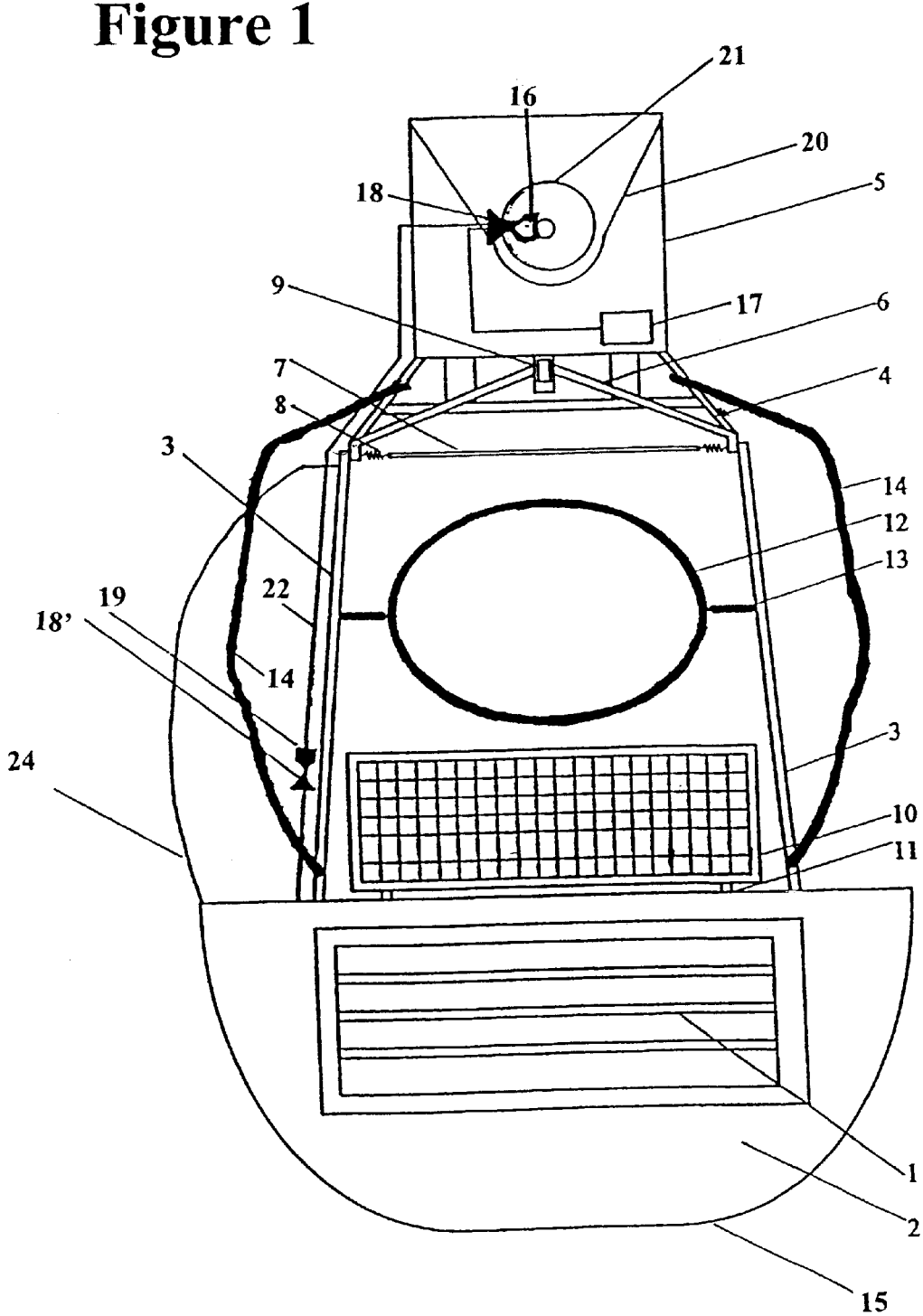
FIG. 1 is a top view of the mobile grill device constructed according to the principles of the invention.

FIG. 1 illustrates one embodiment of the invention. Grill 1 is depicted as being surrounded by a semicircular support 2. Grill 1 may include a three-way burner, fat trap, grill grate, flame trap and various other accessories as is known in the art. Preferably, the surface of grill 1 is substantially reduced such that only about twenty sausages may be placed on it at a time. However, the burner capacity is increased so that less time is required for cooking. In a preferred embodiment, only one burner loop with three arms within grill 1 is provided. Equipment having several burner loops known in the prior art is not required.

Support 2 is preferably constructed of aluminum sheet metal having a thickness of 2 mm and may serve as a place for the deposit of foodstuffs and/or as the holder for grill 1. Support 2 may also provide a surface for the releasable attachment of protective shield 15, which promotes hygienic use of the mobile grill device. Protective shield 15 provides a safeguard screen to protect the public from the spitting or splattering caused by grease, fat or other foodstuffs, and serves to protect the foodstuffs from public contamination. In a preferred embodiment, the top of protective shield 15 is arranged at eye level. For example, a protective shield 15 having a height of 50 cm and a thickness of 2 mm has been an effective device for preventing foodstuffs from being sneezed on or touched by customers.

In another embodiment, as shown in FIG. 1, protective shield 15 may be extended on the right side of the mobile grill device, from the point of view of the operator, and an elongated guide rail 24 attached to support 2 may be utilized to prevent access to the right side of the operator and grill 1—leaving only the left side of the mobile grill device available for the exchange of foodstuffs and money. Of course, the extension of protective shield 15 and guide rail 24 may be disposed on the left side of the mobile grill device, from the point of view of the operator. One preferred material of construction for protective shield 15 is Makrolon®; however, any material forming a barrier between grill 1 and the public may be employed. Support 2 and guide rail 24 may be constructed of any suitable, hygienic material.

Figure 2:
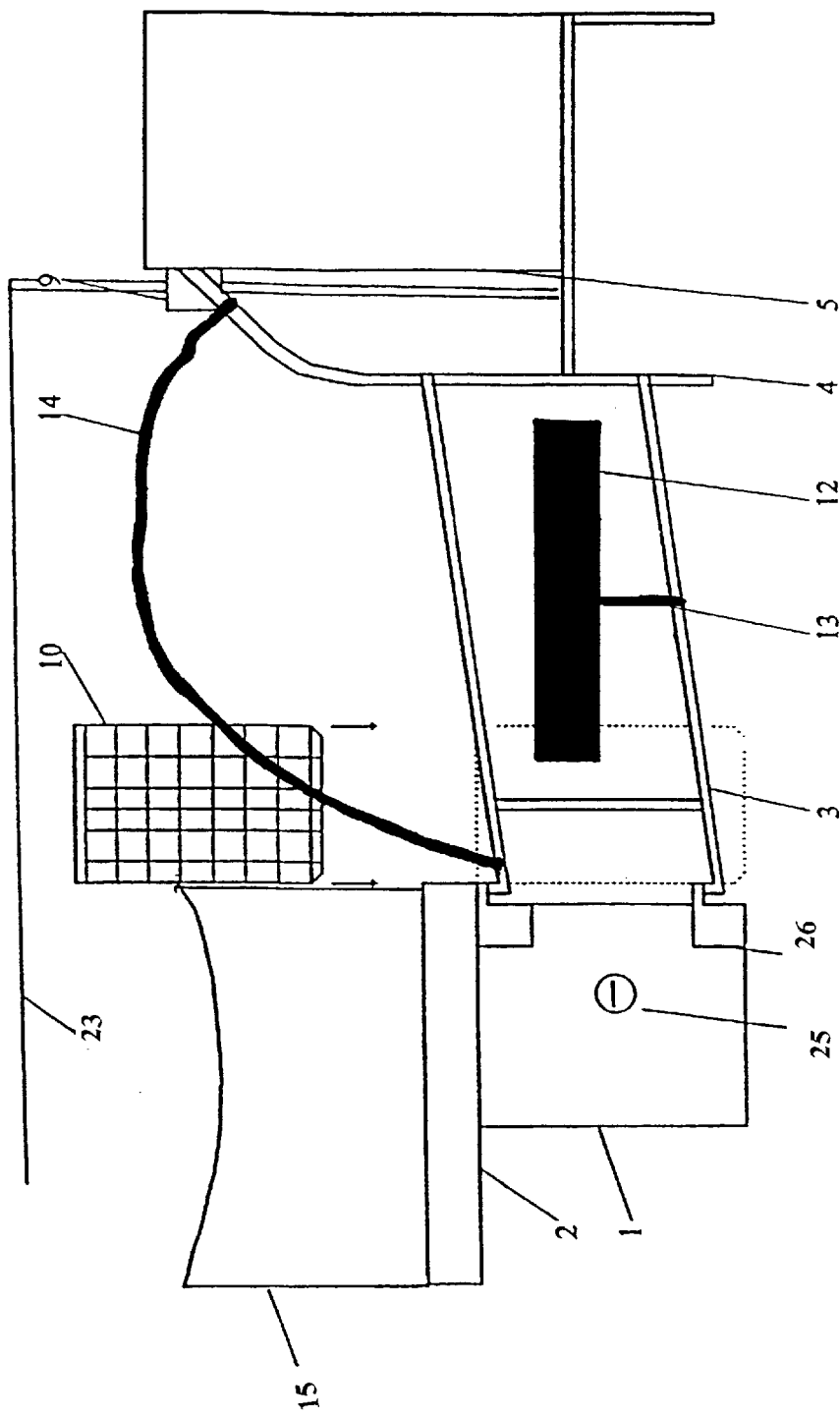
FIG. 2 is a side view of the mobile grill device illustrated in FIG. 1.

Upper and lower longitudinal spars or linkages 3 are shown on either side of the mobile grill device that link support 2 to frame 4. Longitudinal spars 3 may be detachably connected to frame 4 using a fastening connector such as bolts or screws. As depicted in FIG. 2, longitudinal spars 3 are connected by a vertical spar, which is illustrated as being disposed in the vicinity of inserted storage bin 10. In a preferred embodiment, longitudinal spars 3 continue under the arms past the body of an operator—away from grill 1—at an inclined angle of about 110°.

The forward ends of longitudinal spars 3, adjacent grill 1, may be provided with eyes or openings into which the downward-projecting prongs 26, which are attached to grill 1, may be inserted. Thus, in a preferred embodiment, four prongs 26 are depicted as being disposed on either side and at both the top and bottom of grill 1 to enable insertion into four openings associated with four longitudinal spars 3 to provide a secure engagement. Of course, any other suitable detachable and undetachable connection may be employed and a greater or lesser number of prongs and spars may be employed based on the weight and dimensions of the grill, the frame, the overall mobile grill device, and other design considerations.

At the bottom of the frame 4, two transverse spars 6 leading away from the frame 4 extend from the operator towards a triangle behind the operator's back and meet there at a point. This triangle forms a platform for container 5 and power supply unit 21, which may be placed in the container 5. Preferably, a lid covers container 5. Power supply unit 21 may include a gas bottle, a liquid gas bottle, a gas tank, or the like. In a preferred embodiment, power supply unit 21 may be secured in container 5 by means of a tightening belt or belts 20 which prevent power supply device 21 from overturning. In another preferred embodiment, container 5 is a container that is approved for holding gas bottles and gas tanks. For example, a container approved for carrying a bottle having a Deutsches Institut für Normung e.V. (DIN) number would be advantageous.

A rechargeable battery 17 may be disposed within container 5 and may be designed to provide a voltage of 12 V to power remote gas switch 16 and tilt sensor 17. Of course, tilt sensor 17 may be attached at any other suitable position on the mobile grill device such as frame 4, grill 1, longitudinal spar 3, and power supply unit 21. Tilt sensor 17 is designed such that it responds to any sloping position or lateral tilt of about 45° or greater. When actuated, remote gas switch 16 stops the flow of gas. Thus, in a preferred embodiment, in the case of an emergency, such as the mobile grill device coming close to tipping over or in fact tipping over, tilt sensor 17 sends a signal to remote gas switch 16 to automatically discontinue the flow of gas to grill 1. Of course, tilt sensor may be programmed or constructed to respond to a variety of angles of tilt and the battery may be designed to provide a range of voltages. In another preferred embodiment, pressure relief valve 18 may be employed to prevent the uncontrolled outburst of gas in case of damage to grill 1, supply line 22, or any other gas pressure upset. Pressure relief valve 18 may be disposed in supply line 22 adjacent to power supply unit 22. Alternatively, pressure relief valve 18' may be disposed in supply line 22 near grill 1.

For example, the invention may be set up as follows. Power supply unit 21, which is preferably a gas bottle, may be secured in container 5 by the use of one or more tightening belts 20. Thus, power supply unit 21 cannot slip out of place, even in the case where the operator loses his or her balance. As a matter of convenience, tilt sensor 17 and its power supply unit 21, which is preferably a battery, may be kept in container 5. In a preferred embodiment, tilt sensor 17 has direct contact with remote gas switch 16, which is disposed in the supply line 22 and is preferably located adjacent to gas bottle, whereby a battery powers both tilt sensor 17 and remote gas switch 16. Remote gas switch 16 is preferably designed to shut off the gas supply when the tilt sensor 17 senses an angle of tilt of about 45°; such an angle is equal to a loss of balance.

In a preferred embodiment, in order to restart the gas supply, the balance of the device must be restored, the battery must be reconnected to the tilt sensor 17 and remote gas switch 16, and the remote gas switch 16 must be switched to the on position by actuating a pushbutton on the tilt sensor 17.

In an embodiment employing pressure relief valve 18, a pushbutton on the pressure relief valve 18 may be pushed down for about 7 seconds with the discharge valve on the gas bottle open in order to induce a dynamic head. Thereafter, the gas supply for grill 1 may be controlled or switched off through the use of a globe valve or regulator 25. Preferably, a manual valve 19 may be disposed in the supply line in order to allow the operator to shut off the gas supply at his or her own discretion. Manual valve 19 is preferably a gate valve.

Storage bin 10 may be inserted into two open metal clamps of storage bin support 11 adjacent to grill 1. A projecting bolt pinches storage bin 10 from above into the clamp and prevents it from slipping out. As shown in FIGS. 1 and 2, storage bin 10 has the shape of a rectangular body, which is open at the top. However, any suitable shape such as cubic, triangular, circular, etc., may be employed. The opening may be closed by a cover that preferably pivots open and closed and is preferably constructed of polyvinyl chloride or any other hygenically compatible material. Storage bin 10 may be inserted between the belly of the operator and the grill so that other storage bins and their mounting supports at the sides of the mobile grill device as disclosed by the prior art are not necessary. The storage bin 10 may be made of wire netting, which is far lighter than an aluminum sheet container.

In a central portion of the mobile grill device a belly band or hip belt 12 and intermediate straps 13 on either side of belly band 12 are illustrated. Belly band 12 and intermediate straps 13 may be adjusted to the waist girth of the operator by means of a buckle. Intermediate straps 13 may be attached to longitudinal spars 3 such that the mobile grill device may be supported by belly band 12. Carrying straps or shoulder belts 14 are depicted as connected to longitudinal spars 3 and frame 4 and may be employed to support the mobile grill device. Of course, a lesser or greater number of intermediate straps 13 or carrying straps 14 may be utilized and attached in any number of locations along the mobile grill device as long as the mobile grill device is balanced and supported. In one embodiment, frame 4 has the shape of a rectangular frame consisting of metal tubing and has a central backrest 7 that may be stretched or tensioned by metal springs 8 disposed between the frame 4 and the backrest 7. Alternatively, belly band 12 may be designed to encircle the operator, frame 4, transverse spars 6, and/or vertical spars or may be fastened to the frame, transverse or vertical spars by an additional intermediate strap or straps (not shown) in order to tighten and affix backrest 7 and the back portion of the mobile grill device to the back of the operator, thereby facilitating distribution of the weight of the mobile grill device on the back of the operator and preventing grill 1 from tilting down.

The low weight or minimization of the weight of the carrying frame with the integrated grill 1 and the freedom of movement permitted by the construction may be explained using the following example. Frame 4 in conjunction with container 5 is suitable for carrying a power supply unit 21 such as a gas bottle, which is similar to that used for thawing or for weed control. Frame 4 is located behind the operator and resembles a knapsack. In this example, frame 4 supports a 3 kg propane gas bottle which is surrounded by a metal container 5. Frame 4 consists of metal tubing and includes a backrest 7 that remains secured within the frame 4 by means of springs 8. The mobile grill device has two carrying straps 14 that lead from the frame 4 to the longitudinal spars 3. Additionally, the mobile grill device has two longitudinal spars 3 both on the left and the right side that connect the frame 4 with the grill 1. The direct connection between the frame 4 and the grill 1 avoids any need for a further receiving device so that the size and the weight of the mobile grill may be reduced as compared to the prior art devices, The mobile grill device of this example has the total weight of about 13 kg, including the 3 kg propane gas tank. Thus, mobile grill device is easily portable for a significant period of time, e.g., more than 7.5 hours.

The mobile grill device of the invention may rest on the shoulders, back, pelvis, hip, belly and thighs of an operator and may be alternately shifted from one part of the body to another. Thus, one part of the body of the operator may be relieved while burdening another. Specifically, the padded shoulder belts 14 may distribute the weight of the mobile grill device to the shoulders. Alternatively, frame 4 may distribute much of the weight to the back of the operator via backrest 7, thereby relieving the shoulders. Alternatively, storage bin 10 may be placed between the grill 1 and the belly of the operator, thereby supporting the mobile grill device by the abdominal muscular system of the operator as the mobile grill device is prevented from sliding to the ground. Alternatively, storage bin 10 may be attached to the thigh, thereby supporting the mobile grill device with the thigh of the operator. Alternatively, belly band 12 also may be slung around the hips of the operator to support the mobile grill device by using intermediate straps 13, which provide a firm engagement of the mobile grill device with the body of the operator, without employing carrying straps 14. The operator may disconnect all links with the carrying frame and dismount the frame by himself or herself.

The mobile grill device with its carrying frame may be loaded with the above-described elements before being mounted by an operator so that an operator needs only to get into the mobile grill device and then to pull up the device on his body. Then the operator may put the storage bin 10 between the frame and his thigh or belly, or may place the storage bin 10 in storage bin support 11. The operator may then mount the shoulder belts 14 in parallel or crosswise by hooking the loose ends of the shoulder belts 14 into the eyes at the two upper longitudinal spars 3 by means of two spring safety hooks. Then the operator may fasten the intermediate straps 13 of his belly band 12 to provide a firm, but comfortable engagement. Thus, the operator may lift the device on his own with no additional parts needing to be attached or fastened. Since the operator may assemble the mobile grill device in advance, even the gas supply may be opened before lifting the device, thereby permitting the operator to mount and dismount the device on his or her own and begin employing the device immediately.

Alternatively, the mobile grill device may be mounted by fastening belly band 12 around the waist of the operator. The operator may then position himself or herself between the two longitudinal spars 3. The operator may then lift the longitudinal spars 3 at his left and right and pull the mobile grill device up to a necessary level. Intermediate straps 13 extending from belly band 12 may be attached and tightened to longitudinal spars 3 to support the mobile grill device. Carrying straps 14 may then be drawn over the shoulders of the operator and may be readily adjusted by the operator. Of course, the carrying straps 14 may be secured before intermediate straps 13 are attached to the mobile grill device. The storage bin 10 may then be placed in front of the belly and utilized to support the mobile grill device or placed in storage bin support 11.

As discussed above, the construction of mobile grill device of the invention permits an operator to use any one or combination of the supporting elements, including storage bin 10, belly band 12, carrying straps 14 and backrest 7. Thus, the operator may alternatively hold the mobile grill device using only the storage bin 10 standing on his thigh, using only the belly band 12, using only carrying straps 14, using only backrest 7, or using any combination of these various supports. The combination of these alternative supporting elements allows an operator to use a variety of options for carrying the device, permitting the operator to avoid constantly burdening one or more specific parts of his or her body, since the burden associated with supporting the mobile grill device may be rotated from one position to another. Thus, the operator may remain mobile and carry comfortably the device for a long while.

In a preferred embodiment, at the upper end of traverse spars 6 and container 5, an umbrella support 9 may be disposed. An umbrella 23 may, in a preferred embodiment, be removably affixed in umbrella support 9, which is designed for the fixation of a spar of umbrella 23. For example, umbrella 23 may be secured by a bolt screwed into a borehole so that the umbrella stick remains in umbrella support 9. The height of umbrella 23 may be adjusted according to the height of the operator. Umbrella 23 shelters and protects grill 1, support 2, and/or foodstuffs from bad weather, bird droppings, and other adverse effects and may be made of plastic or metal or any other suitable material.

The sale of goods may be effected while walking around in a highly frequented pedestrian mall. The operator is able to move normally like a pedestrian strolling about and may readily evade obstacles.

What is claimed is:

1. A mobile apparatus for grilling foodstuffs by an operator carrying the apparatus, comprising:
    a frame having transverse and longitudinal spars, said frame having a front portion and a rear portion;
    carrying straps connected to said frame;
    a belly band and intermediate straps connected to said frame;
    a grill disposed on the front portion of said frame;
    a power supply unit disposed on the rear portion of said frame and designed for use with said grill;
    a supply line connected between said power supply unit and said grill; and
    safety appliances for avoiding uncontrolled gas outbursts.

2. The apparatus of claim 1 further comprising a protective shield positioned in front of said grill.

3. The apparatus of claim 1 further comprising a spring-tensioned backrest.

4. The apparatus of claim 1 further comprising an additional power supply unit for powering said safety appliances.

5. The apparatus of claim 1 further comprising an additional power supply unit for cooling foodstuffs, beverages and accessories.

6. The apparatus of claim 4, wherein said additional power supply unit provides cooling for foodstuffs, beverages and accessories.

7. The apparatus of claim 4, wherein said additional power supply unit is a battery.

8. The apparatus of claim 1, wherein said power supply unit is a supply tank containing gas.

9. The apparatus of claim 8, wherein said safety appliances comprise a tilt sensor for detecting the sloping position of the apparatus, said tilt sensor connected to one of said frame, said grill, and said supply tank, and a remote gas switch for shutting off said power supply unit, wherein said gas switch is connected to said tilt sensor.

10. The apparatus of claim 8 further compising a holder for housing said supply tank and a tightening belt for securing said supply tank.

11. The apparatus of claim 1 further comprising at least one storage bin, said bin situated between said belly band and said grill, wherein support is effected by wedging said at least one storage bin in the space between said belly band and said grill.

12. The apparatus of claim 1 further comprising at least one storage bin and a storage bin support, said storage bin support retaining said at least one storage bin.

13. The apparatus of claim 1 further comprising an umbrella, said umbrella releasably connected to said frame, wherein the apparatus carried by the operator is screened and sheltered.

14. The apparatus of claim 1 further comprising a hand-operated valve disposed in said supply line adjacent to said grill.

15. The apparatus of claim 2, wherein said protective shield extends to enclose at least one of the lateral sides of said grill.

16. The apparatus of claim 2 further comprising a guide rail, said guide rail supporting said protective shield such that said protective shield extends to enclose at least one of the lateral sides of said grill.

17. The apparatus of claim 1 further comprising a pressure relief valve disposed in said supply line adjacent to said power supply unit.

18. The apparatus of claim 1 further comprising a pressure relief valve disposed in said supply line adjacent to said grill.

19. A mobile apparatus for grilling foodstuffs by an operator carrying the apparatus, comprising:
- a frame having transverse and longitudinal spars, said frame having a front portion and a rear portion;
- a belly band and intermediate straps connected to said frame;
- a grill disposed on the front portion of said frame;
- a power supply unit disposed on the rear portion of said frame and designed for use with said grill;
- a supply line connected between said power supply unit and said grill; and
- safety appliances for avoiding uncontrolled gas outbursts.

20. A mobile apparatus for grilling foodstuffs by an operator carrying the apparatus, comprising:
- a frame having transverse and longitudinal spars, said frame having a front portion and a rear portion;
- carrying straps connected to said frame;
- a belly band and intermediate straps connected to said frame;
- a grill disposed on the front portion of said frame;
- a protective shield positioned in front of said grill;
- a power supply unit disposed on the rear portion of said frame and designed for use with said grill;
- a supply line connected between said power supply unit and said grill; and
- safety appliances for avoiding uncontrolled gas outbursts.

* * * * *